United States Patent Office 2,952,687
Patented Sept. 13, 1960

2,952,687

CERTAIN N-(2-BENZOTHIAZOLYL), AMINOALKYLTHIOALKYL CABOXYLIC ACID AMIDES AND PROCESS

Ernst Habicht, Schaffhausen, Switzerland, assignor to Cilag Limited, Schaffhausen, Switzerland, a Swiss company No Drawing. Filed Feb. 27, 1959, Ser. No. 795,922

Claims priority, application Switzerland Mar. 13, 1958

11 Claims. (Cl. 260—305)

The present invention relates to a process for the production of novel benzothiazoles and their salts.

It was found that benzothiazoles of the general formula

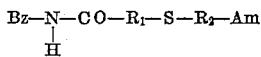

wherein Bz represents a benzothiazolyl-2-radical which may optionally be substituted by a lower alkyl, a lower alkoxy, an alkyl mercapto and/or a halogen, $R_1$ and $R_2$ represent lower straight or branched alkylene radicals and Am represents a secondary or tertiary amino group, show valuable anaesthetic and particularly antimycotic properties.

2-tert. amino - 6 - dialkylaminoalkoxy benzothiazoles having an antimycotic effect have already been produced (compare Brit. P. 751,172). The 2-dimethylamino-6-diethylaminoethoxy benzothiazole dihydrochloride (I) thereof has been introduced into the medical practice. A comparative test of some of the novel compounds obtainable according to the present invention and of I has shown them to be approximately equally effective on fungi. The advantage of the novel compounds over I lies in their being likewise very effective on cocci, such as for instance staphlococci, whereas I has no or only a very weak effect. As in many cases of fungus infection there actually exists a mixed infection (fungus and coccus infection), the advantage of the novel compounds obtainable according to the present invention is clearly evident.

The novel benzothiazoles defined hereinbefore can be produced by reacting a benzothiazole derivative of the formula

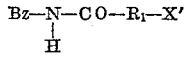

with a compound of the formula

whereby in both formulae Bz, $R_1$, $R_2$ and Am have the aforedefined meaning, whereas one of the symbols X' represents a reactive splittable radical, such as for instance halogen, and the other symbol X' represents the thiol group as such and the thiol group in form of a salt, respectively.

According to this process, it is for instance possible to react a halogeno-paraffin-carboxylic acid benzothiazolide, obtainable by usual processes, with a secondary or tertiary aminoalkanethiol or with an alkali salt thereof. The halogeno-paraffin-carboxylic acid benzothiazolide can of course also be replaced by an aryl or an alkyl sulfonyloxy paraffin-carboxylic acid benzothiazolide.

A preferred method consists in mixing a halogeno-paraffin-carboxylic acid benzothiazolide with a secondary or tertiary aminoalkanethiol in a lower alkyl cyanide, preferably acetonitrile. The reaction is started without outer heat input and completed by short heating. Upon cooling, the hydrohalogenide of the resulting aminoalkylmercapto-paraffinoyl benzothiazolide crystallises and can thus be easily isolated.

According to this process, it is likewise possible to proceed in such manner as to react a mercapto paraffin-carboxylic acid benzothiazolide, the production of which has been described in British Patent No. 699,892, with an aminoalkyl halogenide, working in the presence of basic condensation agents, such as for instance alkali alcoholates in alcohols.

As already mentioned, the method of choice is the reaction of halogeno-acylamino benzothiazoles with secondary or tertiary aminoalkanethiols in an aliphatic nitrile, preferably acetonitrile, this leading directly to the hydrohalides of the final product.

It is thus for instance possible to react: 2-chloroacetaminobenzothiazole, 2-chloroacetamino-6-methyl benzothiazole, 2-chloroacetamino-4,6-dimethyl benzothiazole, 2-chloroacetamino - 6 - methoxy benzothiazole, 2-chloroacetamino - 6 - methylmercapto benzothiazole, 2-chloroacetamino-6-chloro- or -6-bromo-benzothiazole, 2-chloroacetamino - 4,6 - dichloro or -4,6-dibromo-benzothiazole, etc. with dimethylaminoethanthiol, diethylaminoethanethiol, di-n-propylaminoethanethiol, di-isopropylaminoethanethiol, di-n-butylaminoethanethiol, pyrrolidinoethanethiol, piperidinoethanethiol, morpholinoethanethiol, as well as with corresponding propanethiols, such as for instance $\beta$ - dimethylaminoethanthiols, $\gamma$ -dimethylaminoethanethiols, as also with the secondary aminoethanthiols, such as for instance ethylaminoethanthiols, propylaminoethanethiols, butylaminoethanethiols.

It is likewise possible to use in place of the 2-chloroacetaminobenzothiazoles the $\alpha$-halogenopropionyl- or the $\beta$-halogenopropionyl compounds.

Valuable benzothiazoles are obtained in the cases where the aryl of the benzothiazole is substituted by one or two chloro- or bromo-atoms, the alkylene radicals $R_1$ and $R_2$ together do not contain more than 6 carbon atoms, and Am represents a monoalkylamino group, a dialkylamino group, the pyrrolidino group, the piperidino group and the morpholino group, whereby the monoalkylamino group and the dialkylamino group do not contain more than 8 carbon atoms.

The resulting benzothiazolides of the Formula I mentioned hereinbefore can be or are advantageously isolated in form of their salts with inorganic or organic, non-toxic acids. The inorganic acids used for the salt formation are: sulfuric acid, hydrochloric acid, hydrobromic acid, phosphoric acids; the organic acids are: acetic acid, glycolic acid, citric acid, succinic acid, fumaric acid, maleic acid, dihydromaleic acid, methane-sulfonic acid, hydroxyethane-sulfonic acid, salicylic acid, undecylenic acid, and other non-toxic acids.

*Example 1*

20 g. of 2-aminobenzothiazole and 27.3 g. of crystalline sodium acetate are added to 130 cc. of acetone. Subsequently, 18.8 g. of chloroacetylchloride are added dropwise within 35 minutes while cooling and turbinating. The whole is briefly heated to 60° C. and cooled off; 50 cc. of hydrochloric acid 1:1 and 100 cc. of water are then added. The precipitating crystals are filtered off with suction and washed with water. Recrystallisation from glacial acetic acid/water leads to the pure 2-chloroacetamino benzothiazole, which melts at 158–159° C. The yield lies between 17 and 18 g.

A solution of 4.7 g. of dimethylaminoethanethiol in 10 cc. of acetonitrile is added dropwise while turbinating to 10 g. of the above chloroacetamino product in 20 cc. of acetonitrile. The temperature rises by itself to 50° C. Turbination is continued for 15 minutes at this temperature. Subsequently, the reaction solution is cooled and then shaken with 100 cc. of ether and 100 cc. of 1 N-hydrochloric acid. After separation of the layers, the aqueous acid part is rendered alkaline by means of caustic soda and the precipitating oil is taken up in ether. The ether is evaporated after drying and the residue distilled under high vacuum. The 2-(β-dimethylaminoethyl-mercaptoacetyl)-amino benzothiazole distills under 0.01 mm. at 197–205° C. By carefully treating a methanolic solution of the novel benzothiazole with water, the substance is obtained in form of colourless crystals melting at 43–44° C.

*Example 2*

The compound described in Example 1 can also be obtained by reacting 2-mercapto-acetylamino benzothiazole (M.P. 191° C.) with dimethylaminoethylchloride in the presence of sodium ethylate in ethanol.

*Example 3*

When reacting 57 g. of 2-chloroacetamino-benzothiazole with 34 g. of diethylaminoethanethiol in 200 cc. of acetonitrile in a manner analogous to that described in Example 1, 52 g. of 2-(β-diethylaminoethyl-mercaptoacetyl)-amino-benzothiazole melting at 86–87° C. are obtained.

*Example 4*

The reaction of 42.3 g. of 2-amino-6-ethoxy benzothiazole with 30.8 g. of chloroacetylchloride in 300 cc. of acetone in the presence of 44.4 g. of crystalline sodium acetate leads to 40 g. of 2-chloroacetylamino-6-ethoxy benzothiazole, which melts at 169–170° C. The compound can be purified by recrystallisation from acetic acid.

20 g. of the above resulting chloroacetyl compound are mixed with 10.4 g. of diethylaminoethanethiol in 80 cc. of acetonitrile. Immediately, a violent reaction sets in. After the reaction has subsided, there follows turbination for 15 minutes at 40° C. and working up in the manner indicated in Example 1. By recrystallisation from dilute methanol, 21–22 g. of 2-(β-diethylaminoethyl-mercaptoacetyl)-amino-6-ethoxy benzothiazole are obtained; it melts at 137–138° C. The new compound forms crystalline salts not only with hydrochloric acid, phosphoric acid and sulfuric acid, but with oxalic acid, fumaric acid, succinic acid, citric acid and salicylic acid as well.

When reacting 2-chloroacetamino-6-ethoxy benzothiazole with pyrrolidinoethanethiol, the 2-(β-pyrrolidinoethyl-mercapto-acetyl)-amino-6-ethoxy benzothiazole melting at 141–142° C. is obtained.

*Example 5*

50–55 g. of the chloroacetyl derivative are obtained from 69 g. of 2-amino-6-chloro benzothiazole, 76 g. of crystalline sodium acetate and 53.2 g. of chloroacetylchloride in 400 cc. of acetone. After recrystallisation from acetic acid, the new product melts at 212° C.

10.7 g. of diethylaminoethanethiol are added to a solution of 20 g. of the above resulting chloroacetyl derivative in 60 cc. of acetonitrile. The temperature rises by itself to about 50° C. The whole is now heated to boiling for 25 hours and after cooling treated with 200 cc. of ether, which causes immediately crystallisation. After some standing, the crystals are filtered off with suction, washed first with ether and then with ethanol and subsequently dried. This yields 23.9 g. of a substance melting at 181° C., which represents the hydrochloride of the 2-(β-diethylaminoethyl-mercapto-acetyl)-amino-6-chloro benzothiazole. This hydrochloride is very readily soluble in water and fairly well soluble in hot methanol and ethanol.

Instead of diethylaminoethanethiol, it is likewise possible to react β-piperidinoethanethiol with the chloroacetyl derivative, thereby obtaining the 2-(β-piperidinoethyl-mercapto-acetyl)-amino-6-chloro benzothiazole, which boils under 0.01 mm. at 205–207° C.

*Example 6*

In a manner analogous to that described in Example 5, there is obtained from 7 g. of 2-chloroacetylamino-6-chloro benzothiazole and 3.2 g. of dimethylaminoethanethiol in 50 cc. of acetonitrile the hydrochloride of the 2-(β-dimethylaminoethyl-mercapto-acetyl)-amino-6-chloro benzothiazole, which melts at 143–145° C. It can be recrystallised from absolute ethanol/absolute ether.

*Example 7*

The 2-(β-di-n-propylaminoethyl-mercapto-acetyl)-amino-6-chloro benzothiazole is obtained from 70 g. of 2-chloroacetylamino-6-chloro benzothiazole and 48 g. of di-n-propylaminoethanethiol in 400 cc. of acetonitrile. The hydrochloride of the new compound, after having been recrystallised from absolute ethanol/absolute ether, melts at 120° C.

*Example 8*

70 g. of 2-chloroacetylamino-6-chloro benzothiazole in 500 cc. of acetonitrile are reacted in the usual manner with 53 g. of di-n-butyl-aminoethanethiol. The base is set free from the precipitating hydrochloride with the aid of caustic soda. The base is taken up in ether and the ethereal solution washed with caustic soda and water and then dried. After distillation of the ether, the base begins to crystallise. Upon recrystallisation from petroleum-ether, it melts at 72–73° C. The fumarate or the maleate can be produced in ethereal solution from the resulting 2-(β-di-n-butylaminoethyl-mercapto-acetyl)-amino-6-chloro benzothiazole.

The reaction of 2-chloro-acetylamino-6-chloro benzothiazole with N-n-butylaminoethanethiol leads to the benzothiazole derivative of the formula

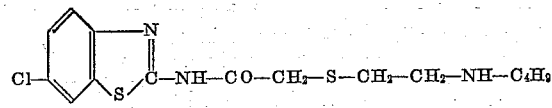

This product boils under 0.02 mm. at 210–212° C.

*Example 9*

By reacting 30 g. of 2-chloroacetylamino-4,6-dichloro benzothiazole with 11 g. of dimethylaminoethanethiol in 200 cc. of acetonitrile, 32 g. of 2-(β-dimethylaminoethyl-mercapto-acetyl)-amino-4,6-dichloro benzothiazole are obtained. The new product boils under 0.02 mm. at 225–227° C.

The hitherto unknown 2-amino-4,6-dichloro benzothiazole is obtained in the following manner:

50 g. of 2,4-dichloroaniline and 130 g. of ammonium-rhodanide are dissolved in 285 cc. of hot methanol. 164 g. of copper$^{II}$chloride in 285 cc. of methanol are added dropwise in such manner that the solution remains continuously boiling. The heating is continued for 2 hours with uninterrupted stirring. Subsequently, 1000 cc. of 2 N-hydrochloric acid are added, the copper rhodanide is filtered off with suction and extracted twice with 250 cc. each of hot water. The combined aqueous/methanolic solutions are treated with coal and filtered. The filtrate is adjusted to a pH value of 8 and cooled. At the end of 24 hours, the precipitating mass is filtered with suction and recrystallised from methanol. The resulting 2-amino-4,6-dichloro benzothiazole melts at 253–255° C. Extraction of the copper rhodanide residue with aqueous methane-sulfonic acid solution yields further quantities of the product. The yield totals between 25 and 30%.

Example 10

When reacting 2-chloroacetylamino-4,6-dichloro benzothiazole with diethylaminoethanethiol in a manner analogous to that described in Example 1, the 2-(β-diethylaminoethyl-mercapto-acetyl)-amino - 4,6 - dichloro benzothiazole is obtained as an oil boiling under 0.01 mm. at 208–211° C. It is readily soluble in dilute mineral acids and also forms crystalline salts with such acids, namely with sulfuric acid, hydrochloric acid, and phosphoric acid. Crystalline salts which are readily soluble in water can likewise be obtained with the aid of organic acids, such as for instance fumaric acid, maleic acid, phthalic acid, p-hydroxy-benzoic acid, undecylenic acid and further unsaturated paraffin-carboxylic acids.

By reacting 2-chloroacetylamino - 6 - methyl - mercapto benzothiazole with diethylaminoethanethiol in acetonitrile, the 2-(β-diethylamino-ethyl - mercapto-acetyl) - amino-6-methylmercapto benzothiazole is obtained. The new product boils under 0.015 mm. at 198–199° C.

Example 11

When working in a manner analogous to that described in Example 1, the 2-(β-dimethylaminoethyl-mercapto-acetyl)-amino-4,6-dibromo benzothiazole is obtained from 2-chloroacetylamino-4,6-dibromo benzothiazole and dimethylaminoethanethiol in acetonitrile. The new product, obtained as an oil, boils under 0.02 mm. at 230–235° C.

It is furthermore possible to obtain by working in a manner analogous to that described by the examples, the following new products:

2-[α-(β'-pyrrolidinoethyl-mercapto)-propionyl]-amino-6-chloro benzothiazole, B.P. 0.01 mm.: 210–212° C., from 2-(α-bromopropionyl)-amino-6-chloro benzothiazole and β-pyrrolidinoethanethiol;

2-[α - (β'- diethylaminoethyl - mercapto) - propionyl]-amino-6-methyl benzothiazole;

2-(β - diethylaminoethyl - mercapto - acetyl) - amino-6-methyl benzothiazole;

2-(β-diethylaminopropyl - mercapto - acetyl) - amino-6-methyl benzothiazole.

What I claim is:

1. New chemical compounds selected from the group consisting of benzothiazoles and salts thereof with non-toxic acids, said benzothiazoles having the formula

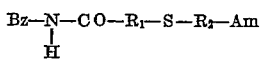

wherein Bz is of the group consisting of the monochloro-benzothiazolyl-2-radical, the monobromo-benzothiazolyl-2-radical, the dichloro-benzothiazolyl-2-radical, and the dibromo-benzothiazolyl-2-radical, $R_1$ and $R_2$ represent alkylene radicals which contain together not more than 6 carbon atoms, and Am is of the group consisting of the monoalkylamino group, the dialkylamino group, the pyrrolidino group, the piperidino group and the morpholino group, whereby the monoalkylamino group and dialkylamino group do not contain more than 8 carbon atoms.

2. The new chemical compound of the formula

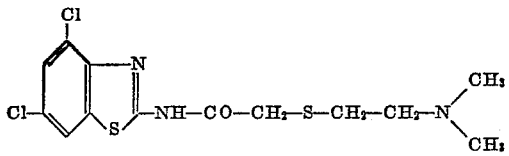

3. The new chemical compound of the formula

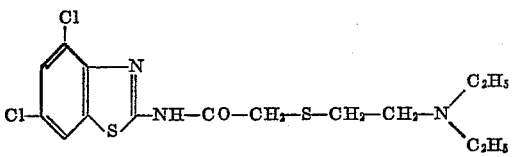

4. The new chemical compound of the formula

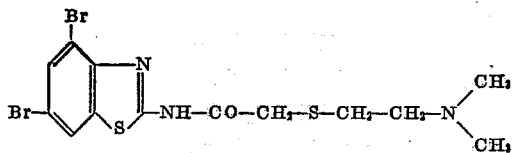

5. The new chemical compound of the formula

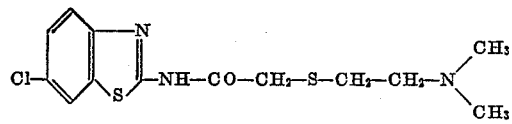

6. The new chemical compound of the formula

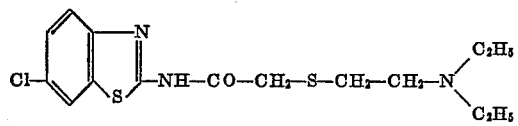

7. The new chemical compound of the formula

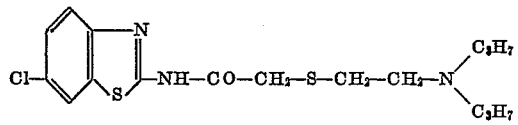

8. The new chemical compound of the formula

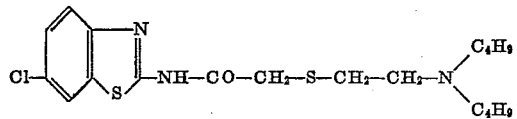

9. A process for the production of new benzothiazoles of the formula

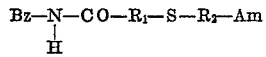

wherein Bz is of the group consisting of the monochloro-benzothiazolyl-2-radical, the monobromo-benzothiazolyl-2-radical, the dichloro-benzothiazolyl-2-radical, and the dibromo-benzothiazolyl-2-radical, $R_1$ and $R_2$ represent alkylene radicals which contain together no more than 6 carbon atoms, and Am is of the group consisting of the monoalkylamino group, the dialkylamino group, the pyrrolidino group, the piperidino group, an the morpholino group, whereby the monoalkylamino group and dialkylamino group do not contain more than 8 carbon atoms, said process comprising reacting a benzothiazole derivative of the formula

with a compound of the formula

wherein one of the symbols X' represents a halogeno atom and the other symbol X' represents the thiol group.

10. A process for the production of new benzothiazoles of the formula

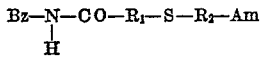

wherein Bz is of the group consisting of the monochloro-benzothiazolyl-2-radical, the monobromo-benzothiazolyl-2-radical, the dichloro-benzothiazolyl-2-radical, and the dibromo-benzothiazolyl-2-radical, $R_1$ and $R_2$ represent alkylene radicals which contain together no more than 6 carbon atoms, and Am is of the group consisting of the monoalkylamino group, the dialkylamino group, the pyrrolidino group, the piperidino group, and the morpholino group, whereby the monalkylamino group and dialkylamino group do not contain more than 8 carbon atoms, said process comprising reacting a benzothiazole derivative of the formula $$Bz-NH-CO-R_1-halogeno$$

with a compound of the formula $$HS-R_2-Am$$

in a lower alkyl cyanide as solvent.

11. A process as claimed in claim 10, wherein the solvent is acetonitrile.

References Cited in the file of this patent

UNITED STATES PATENTS 2,657,136   Knott et al. _____ Oct. 27, 1953